US009983611B1

(12) United States Patent
Boneh

(10) Patent No.: US 9,983,611 B1
(45) Date of Patent: May 29, 2018

(54) POWER MANAGEMENT IN A COMPLEX INTEGRATED CIRCUIT

(71) Applicant: Amazon Technologies, Inc., Seattle, WA (US)

(72) Inventor: Ronen Boneh, Tel Aviv (IL)

(73) Assignee: Amazon Technologies, Inc., Seattle, WA (US)

(*) Notice: Subject to any disclaimer, the term of this patent is extended or adjusted under 35 U.S.C. 154(b) by 265 days.

(21) Appl. No.: 14/724,634

(22) Filed: May 28, 2015

Related U.S. Application Data

(60) Provisional application No. 62/004,231, filed on May 29, 2014.

(51) Int. Cl.
G06F 1/18 (2006.01)
G05F 1/66 (2006.01)
G05B 15/02 (2006.01)

(52) U.S. Cl.
CPC ............... *G05F 1/66* (2013.01); *G05B 15/02* (2013.01); *G06F 1/189* (2013.01)

(58) Field of Classification Search
CPC ................................ G06F 1/189; H02H 9/001
See application file for complete search history.

(56) References Cited

U.S. PATENT DOCUMENTS

2011/0205680 A1* 8/2011 Kidd ..................... G06F 1/26
  361/93.2
2013/0191656 A1* 7/2013 Ahmad ................ G06F 1/3243
  713/300
2013/0275782 A1* 10/2013 Svilan ..................... G06F 1/26
  713/300

* cited by examiner

Primary Examiner — Albert Wang
(74) Attorney, Agent, or Firm — Kilpatrick Townsend & Stockton LLP

(57) ABSTRACT

A system includes a first set of conductors coupled to at least one power source; a second set of conductors coupled to a first power consuming portion of an integrated circuit; multiple power gates coupled between the first and second sets of conductors; and a control circuit configured to gradually activate the multiple power gates during an activation period to provide a nonlinear rate of change of an impedance between the first and the second sets of conductors during the activation period.

19 Claims, 7 Drawing Sheets

POWER MANAGEMENT IN A COMPLEX INTEGRATED CIRCUIT

CROSS-REFERENCE TO RELATED APPLICATION

This application is a non-provisional application of and claims priority to U.S. Provisional Application No. 62/004,231, filed May 29, 2014, which is incorporated by reference herein in its entirety.

BACKGROUND

Integrated circuits may include multiple cores that are independently controlled. Non-limiting examples of cores include digital processors, general purpose processors, communication fabrics and the like.

In order to save power, cores can be shut down when they are not required, and be powered up (active) when they are required. Accordingly, one core can be shut down while another core is active, or one core can be powered up while another core is active.

Activating or shutting down a core while another core is active may affect the voltage and/or current supplied to the already active core and thus may dramatically affect the performance of the already active core. Generally, an activation of a previously inactive core starts with a dramatic increment of the current consumption of that core. A main power source usually cannot instantaneously supply all the desired current consumption of the core being activated, at least partly due to the inductance of the power distribution network that connects the main power source to the core. Thus, the core being activated may consume power from the already active core. This consumption may dramatically interfere with the operation of the already active core.

There is a growing need to provide a power management scheme that will allow activating a core without dramatically interfering with the operation of another core.

BRIEF DESCRIPTION OF THE DRAWINGS

Various embodiments will be described with reference to the drawings, in which.

DETAILED DESCRIPTION

Figure 1:
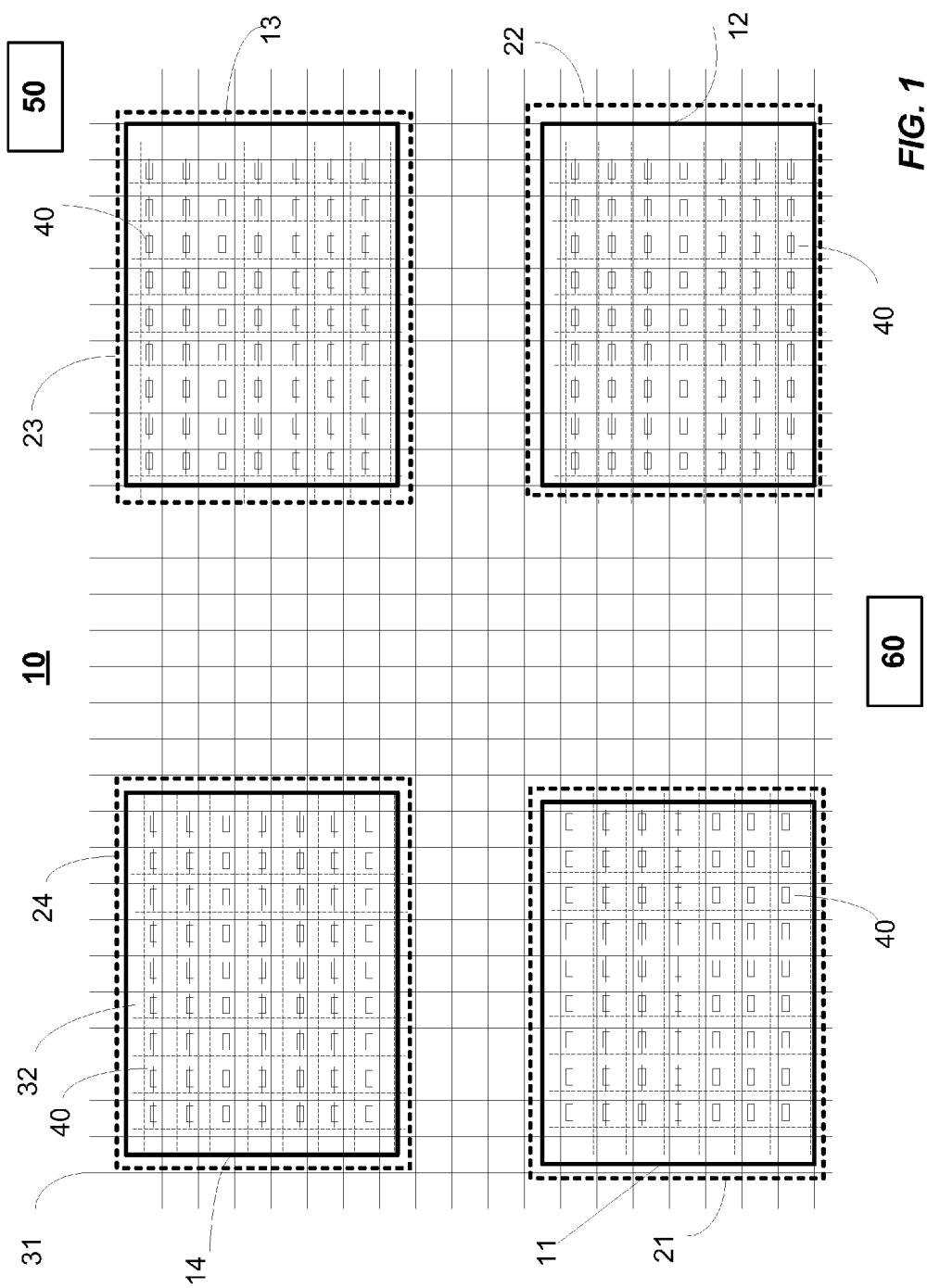
FIG. 1 illustrates a system including multiple cores, according to some embodiments.

In integrated circuits having multiple power consuming portions (e.g., multiple processing cores), each power consuming portion may be independently turned on or off. However, turning on or off a power consuming portion can have an adverse impact on the performance of the remaining portions of the integrated circuit. For example, if the response time of the main power source supplying power to the integrated circuit is not fast enough to react to the activation of a processing core, the processing core being activated may draw current from the remaining processing cores of the integrated circuit during a transient period until the main power source can supply sufficient current to the processing core being activated. The techniques described herein can reduce the impact that turning on or off a power consumption portion may have on the remaining portions of an integrated circuit. In some embodiments, power gates along the power path between the main power source and the power consuming portion being turned on or off can be controlled in a manner to provide a nonlinear rate of impedance change. This nonlinear rate of impedance change can reduce the amount of current drawn from the remaining portions of the integrated circuit during the transient period to limit the impact that turning on or off the power consuming portion has on the rest of the integrated circuit.

In the following description, various embodiments will be described. For purposes of explanation, specific configurations and details are set forth in order to provide a thorough understanding of the embodiments. However, it will be apparent to one skilled in the art that the embodiments may be practiced without some specific details. Furthermore, well-known features may be omitted or simplified in order not to obscure the embodiments being described.

The subject matter regarded as the invention is particularly pointed out and distinctly claimed in the concluding portion of the specification. The present disclosure, however, both as to the organization and the method of operation, together with objects, features, and advantages thereof, may be best understood by reference to the following detailed description when read with the accompanying drawings.

It will be appreciated that, for simplicity and clarity of illustration, elements shown in the figures have not necessarily been drawn to scale. For example, the dimensions of some of the elements may be exaggerated relative to other elements for clarity. Further, where appropriate, reference numerals may be repeated among the figures to indicate corresponding or analogous elements.

Because the illustrated embodiments may, for the most part, be implemented using electronic components and circuits known to those skilled in the art, details will not be explained in any greater extent than that considered necessary as illustrated above, for the understanding and appreciation of the underlying concepts of the present disclosure and in order not to obfuscate or distract from the teachings of the present disclosure.

FIG. 1 illustrates a system 10 according to some embodiments. System 10 may include a main power source 50, an integrated circuit device having four cores 11, 12, 13, and 14 (e.g., processing cores), a first set of conductors 31 (e.g., implementing a primary power grid), a second set of conductors 32 (e.g., implementing a secondary power grid for each core), four secondary power sources 21, 22, 23, and 24, a controller 60, and a plurality of power gates 40. First set of conductors 31 and secondary power sources 21, 22, 23, and 24 receive power from main power source 50 and distribute the power to cores 11, 12, 13, and 14 through the plurality of power gates 40 and second set of conductors 32. Controller 60 manages the operation of the plurality of power gates 40 to control the combined impedance of the plurality of power gates and thus the current delivered to cores 11, 12, 13, and 14.

In some embodiments, system 10 may include variations in the number of components shown in FIG. 1. For example, system 10 may include one or more main power sources, and/or include one or more first set of conductors 31. System 10 may include two or more cores, such as two, three, four, or more than four cores. In some embodiments, system 10 may include no secondary power source, and/or may include one or more secondary power sources, such as one, two, three, four, or more than four secondary power sources. In some embodiments, system 10 may include two or more second set of conductors 32. In some embodiments, system 10 may include one or more controllers 60.

Main power source 50 may take power from an external power source. In some embodiments, main power source 50 may include additional circuits such as voltage regulators and/or capacitors for regulating the voltage and/or generating voltages at different levels. The power from main power source 50 is distributed to the system through the first set of conductors 31.

In some embodiments, the first set of conductors 31 may be configured as a grid as shown or other configurations suitable for delivering power to various portions of the system. In some embodiments, the first set of conductors 31 may be arranged in shapes other than a grid. In some embodiments, the first set of conductors 31 may include on-chip capacitors attached thereon, such as polysilicon-insulator-polysilicon (PIP) capacitors, MOS capacitors, and metal-insulator-metal (MIM) capacitors, which act as localized batteries to provide power to local circuits with a short response time. The first set of conductors 31 and other circuit components connected to it may also act as capacitive elements.

In some embodiments, secondary power sources 21, 22, 23, and 24 receive power from main power source 50 through the first set of conductors 31. In some embodiments, secondary power sources 21, 22, 23, and 24 are at least partially isolated from each other such that a voltage or current fluctuation on one secondary power source would not significantly affect other secondary power sources. Similar to the first set of conductors 31, secondary power sources may include on-chip capacitors, such as PIP capacitors, MOS capacitors, and MIM capacitors, which act as localized batteries to provide power to local cores or circuit blocks with a short response time.

The plurality of power gates 40 connect secondary power sources 21, 22, 23, and 24, and/or the first set of conductors 31 to the second set of conductors 32. The plurality of power gates 40 may be coupled in parallel between the first set of conductors 31 and the second set of conductors 32. In some embodiments, the plurality of power gates 40 are configured into multiple matrices with each matrix allocated to one of cores 11, 12, 13 and 14. The power gates allocated to a core control the impedance between the first set of conductors 31 and the second set of conductors 32 that are proximate to the core. In some embodiments, the plurality of power gates may be configured into a regular or irregular matrix, and the like.

In some embodiments, the plurality of power gates 40 may be individually controlled. In some embodiments, the plurality of power gates 40 may be configured into multiple groups (e.g., may be referred to as power gate groups). In some embodiments, power gates in a group may be controlled by a single control signal. The power gates corresponding to a core can be grouped into power gate groups having the same or different associated impedances.

In some embodiments, the plurality of power gates 40 may have substantially the same parameters, such as the current each gate can carry and the on-state impedance. In some embodiments, the plurality of power gates 40 may differ from each other. For example, in some embodiments, some power gates may have higher on-state impedance than some other power gates. In some embodiments, a nonlinear change of combined impedance may be a function of both the number of power gates activated and the on-state impedance of each power gate.

In some embodiments, the second set of conductors 32 may be configured into a grid or other configurations suitable for delivering power to various portions of a core. In some embodiments, the second set of conductors 32 may be arranged in shapes other than a grid. In some embodiments, the second set of conductors 32 may also have on-chip capacitors attached thereon to provide power to various portions on the core with an even shorter response time to accommodate for higher frequency voltage or current variations. The second set of conductors 32 and other circuit components connected to it may also act as capacitive elements.

Controller 60 manages the power distribution on system 10. In some embodiments, controller 60 controls the operation of the plurality of power gates 40 connecting the first set of conductors 31 and the second set of conductors 32 to adjust the impedance of the electrical connection between the first set of conductors 31 and a second set of conductors 32. In some embodiments, controller 60 sends control signals to the plurality of power gates 40, and synchronizes the activation and deactivation of power gates allocated to each core with desired activation and deactivation events of these cores. According to some embodiments, controller 60 is configured to gradually activate multiple power gates allocated to a core being activated during a core activation period of that core to provide a nonlinear rate of impedance change during the core activation period.

In some embodiments, the nonlinear rate of impedance change can be achieved by switching on (or off) the plurality of power gates 40 in a sequence such that the magnitude of the rate of the change in impedance increases (or decreases) during the activation period. For example, when a core is being turned on, controller 60 may activate the power gate groups at a periodic interval where each sequential power gate group being activated has a higher associated impedance than the previous power gate group. This can be achieved, for example, by varying the number of individual power gates being activated at each time interval. As another example, controller 60 may activate power gate groups in a sequence where the time interval between the activation of each power gate group is varied (e.g., decreasing the time between activation such as 50 microseconds between activation of first group and second group, 20 microseconds between activation of the second group and third group, 10 microseconds between activation of the third group and fourth group, etc.). Varying the time interval between the activations of the power gate groups can achieve a nonlinear rate of change of impedance even when each power gate group has the same associated impedance. In some embodiments, both the number of power gates being activated at each time and the time interval between activations can be varied.

Figure 2:
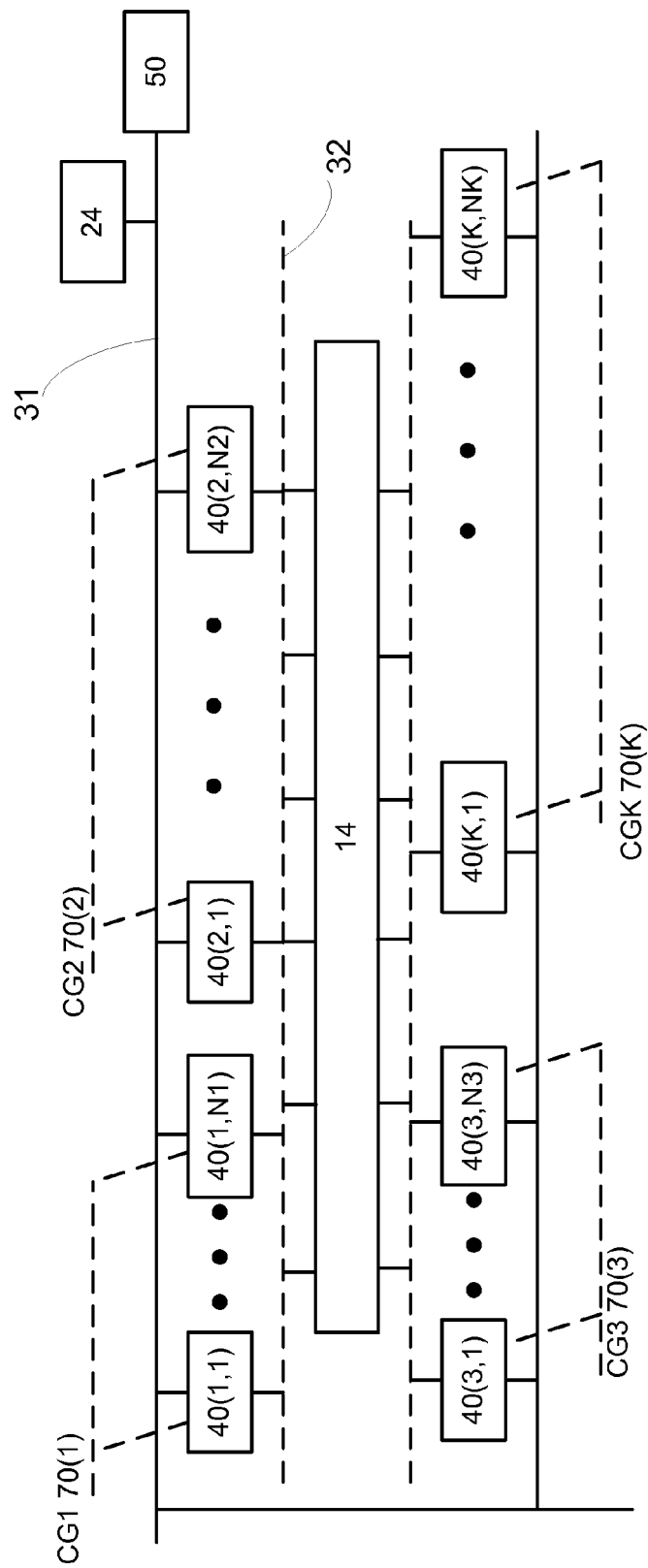
FIG. 2 illustrates a portion of a first set of conductors, a portion of a second set of conductors, and a plurality of power gates, according to some embodiments.

FIG. 2 illustrates a portion of a system 10 according to some embodiments. For simplicity of explanation, FIG. 2 only illustrates the power management of a core 14 using power gates and other resources allocated to core 14. FIG. 2 includes a portion of the first set of conductors 31, secondary power source 24, a portion of the second set of conductors 32, a plurality of groups of power gates 40, and core 14 of system 10.

As shown in FIG. 2, main power source 50 and secondary power source 24 are connected to the first set of conductors 31. Core 14 is connected to the second set of conductors 32 at various locations. A plurality of groups of power gates are connected between the first set of conductors 31 and the second set of conductors 32 at various locations. In some embodiments, the number of groups of power gates allocated to each core may vary, depending on parameters such as the power consumption of the core, the power-on characteristics of the core, the strength of neighboring secondary power sources, and the impedance of each power gate.

In the embodiment illustrated in FIG. 2, there are K groups of power gates, and each of the K groups has N1, N2, ..., or NK power gates. For example, Group K may have NK power gates, 40(K, 1), 40(K, 2), ..., and 40(K, NK), where K represents the group number, and NK represents the number of power gates in Group K. Thus, Group 1 includes power gates 40(1, 1), 40(1, 2), ... and 40(1, N1); Group 2 includes power gates 40(2, 1), 40(2, 2), ... and 40(2, N2); and so on. In some embodiments, the numbers of power gates per group N1, N2, ..., and NK differ from each other. In some embodiments, N1, N2, ..., and NK are selected such that the numbers N1, N2 ... NK represent points on a nonlinear function curve.

In some embodiments, the plurality of groups of power gates may be independently controlled by separate control signals CG1 70(1)-CGK 70(K), K being a positive integer. These control signals may be generated by controller 60. In some embodiments, the control signals may be delayed versions of each other. For example, in the embodiment illustrated in FIG. 2, control signal CG1 70(1) may control the first group of power gates 40(1, 1)-40(1, N1); control signal CG1 70(2) may control the second group of power gates 40(2, 1)-40(2, N2); control signal CG1 70(3) may control the third group of power gates 40(3, 1)-40(3, N3); and control signal CGK 70(K) may control the Kth group of power gates 40(K, 1)-40(K, NK).

In some embodiments, the plurality of groups of power gates may be activated one after another. In some embodiments, multiple groups of power gates may be activated at substantially the same time. In some embodiments, power gates in each group are activated sequentially one after another by the same control signal due to propagation delay of the control signal. In some embodiments, the sequence of activating the plurality of groups of power gates may be determined by controller 60 dynamically.

In some embodiments, controller 60 can dynamically alter the manner in which the power gates are activated such that the rate of impedance change and duration of a core activation period may differ from that of another core activation period for the same core. In some embodiments, the difference can be introduced if the controller or another entity monitors one or more core activation periods, and determines to change the manner in which the power gates are activated in view of the monitoring. For example, if a nonlinear change in the combined impedance of a core being activated affected another active core in a non-desirable manner, such as a large voltage and/or current and/or performance drop, the combined impedance may be changed in a different nonlinear manner. In some embodiments, the rate of impedance change and duration of a core activation period for one core may also differ from that of the core activation period for another core.

Figure 3:
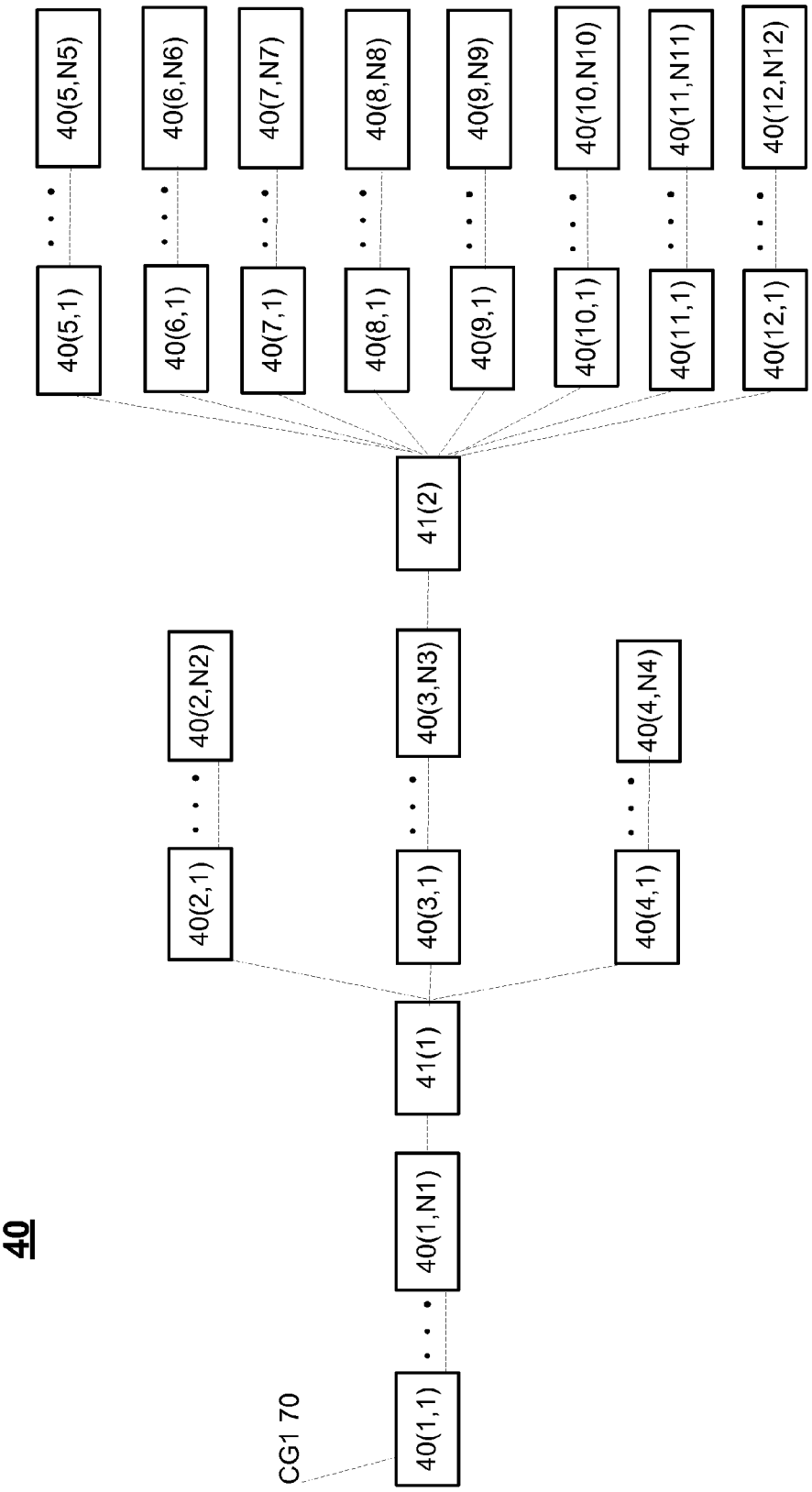
FIG. 3 illustrates an embodiment of a plurality of groups of power gates configured to provide controllable impedance, according to some embodiments.

FIG. 3 illustrates a plurality of groups of power gates configured to provide a controllable impedance according to some embodiments. The plurality of power gates in FIG. 3 include a plurality of groups of power gates that are configured to provide multiple daisy chains. Control signal for different groups of power gates are connected together via delay units. For example, first group of power gates 40(1, 1)-40(1, N1) forms a first daisy chain, where a control signal CG1 70 serially propagates from one power gate to another to activate each power gate. A first delay unit 41(1) receives the control signal after it is delayed by the entire first group of power gates, and provides the delayed control signal, after a further delay, to the first power gate of each of Groups 2-4 of power gates that form three daisy chains to sequentially activate power gates in each group. Groups 2-4 of power gates include power gates 40(2, 1)-40(2, N2), 40(3, 1)-40(3, N3), and 40(4, 1)-40(4, N4), respectively. After all power gates in Group 3 are activated, the control signal at power gate 40(3, N3) is passed on to a second delay unit 41(2) that provides a further delayed control signal to eight groups of power gates that are each configured in a daisy chain to be activated sequentially. These groups include power gates 40(5, 1)-40(5, N5), 40(6, 1)-40(6, N6), 40(7, 1)-40(7, N7), 40(8, 1)-40(8, N8), 40(9, 1)-40(9, N9), 40(10, 1)-40(10, N10), 40(11, 1)-40(11, N11), and 40(12, 1)-40(12, N12).

It is noted that FIGS. 2 and 3 are for illustration purpose only, and only show a portion of the entire power gates. In various embodiments, the number of power gates allocated to each core may be more than a hundred, more than a thousand, more than ten thousand, or even more. Thus, the number of groups of power gates may also exceed a hundred, a few hundred, a few thousand, or even more. As such, the configuration of the daisy chains and the switching sequence can be configured differently in different embodiments. Because of the large number of individually controllable power gates available in the system, the combined impedance of the plurality of power gates can be more precisely controlled at any given time instant.

In some embodiments, depending on the configuration of the daisy chains and the switching sequence, the change of impedance may follow an exponential function, an approximation of an exponential function, or a nonlinear function that changes the impedance in a monotonic or non-monotonic manner. A nonlinear decrement in the impedance involves activating power gates in a nonlinear manner. In some embodiments, to achieve a nonlinear change of impedance, the number of power gates being activated in the switching sequence can be varied. For example, each power gate group being sequentially activated in the switching sequence can have an increasing number of power gates, or a decreasing number of power gates, or a combination of increasing and decreasing number of power gates.

Figure 4:
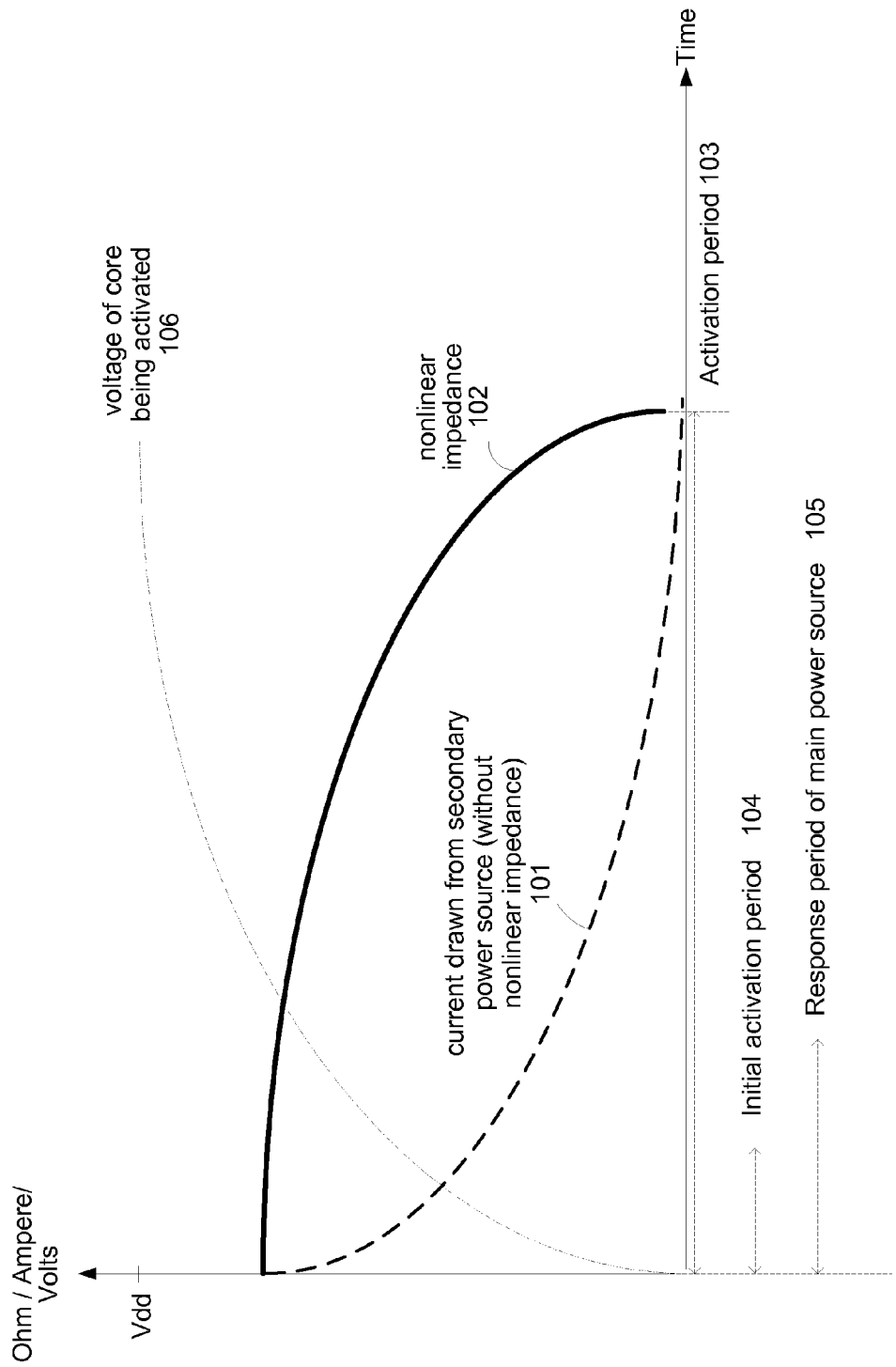
FIG. 4 illustrates example electrical characteristics during a core activation period, according to some embodiments.

FIG. 4 illustrates an example current curve 101 and an example voltage curve 108 of a core during a core activation period without nonlinear control of the impedance between the first grid of conductors and the core, according to some embodiments. As shown in FIG. 4, when a core is initially activated, for example, during an initial core activation period 104, the current consumption of the core is high, partially due to high transient switching current and current required to charge the capacitive load of the core. However, a main power source may not be able to respond to the sudden change in current consumption fast enough due to limited bandwidth of the power source or the power distribution network. Thus, during the response period 105 of the main power source, the core being activated may draw or sink a large amount of current from a secondary power source that is supplying power to an already active core. Draining current from other secondary power sources and/or the already active cores may lower the voltage on the other secondary power sources and/or the already active cores, thus affecting the speed, noise, and other performance characteristics of the already activated cores.

FIG. 4 also shows a change of voltage 106 on the core being activated during the core activation period. Voltage 106 on the core being activated gradually increases until it reaches a steady state level, at least partially because it takes times to charge capacitive loadings on the core, and time for the main power source to respond to the activation of the core.

As shown by current curve 101 in FIG. 4, during the core activation period 103, the current that the core being activated draws from a secondary power source decreases until it reaches a static level. Furthermore, after the response period 105 of the main power source, the main power source could supply a substantial amount of current to the core being activated, and recharge other secondary power sources and/or the already active cores to their nominal working voltage levels.

Thus, it is desirable to limit the peak current consumed by the core being activated during the core activation period 103, especially during the initial core activation period 104 before the response period 105 of the main power source. FIG. 4 further illustrates an embodiment of a nonlinear curve 102 of the rate of change of impedance between a first set of conductors and a second set of conductors that may be used to counter, or at least partially limit, the current consumption drained from the secondary power source of an active core as shown by curve 101. The nonlinear curve 102 represents how a combined impedance of power gates between the first set of conductors and the second set of conductors may change over a core activation period in some embodiments. During the initial core activation period 104, the combined impedance of the power gates is high, thus limiting the current flowing from other secondary power sources and active cores to the core being activated. In some embodiments, the initial core activation period 104 may be in the order of microseconds while the duration of the activation period 103 may be in the order of milliseconds.

When more and more power gates are activated over time, the combined impedance of the power gates reduces gradually in a nonlinear manner. Because the power consumption of the core being activated also reduces gradually over time, and the main power source is able to supply a majority of the required power after its response period, such nonlinear reduction in impedance can limit the current drained by the core being activated to be below a threshold level. When all power gates allocated to the core are activated, the combined impedance of all the power gates is at a minimum value, thus the voltage drop and power consumption on the power gates are at a minimum level for efficient power delivery.

Figure 5:
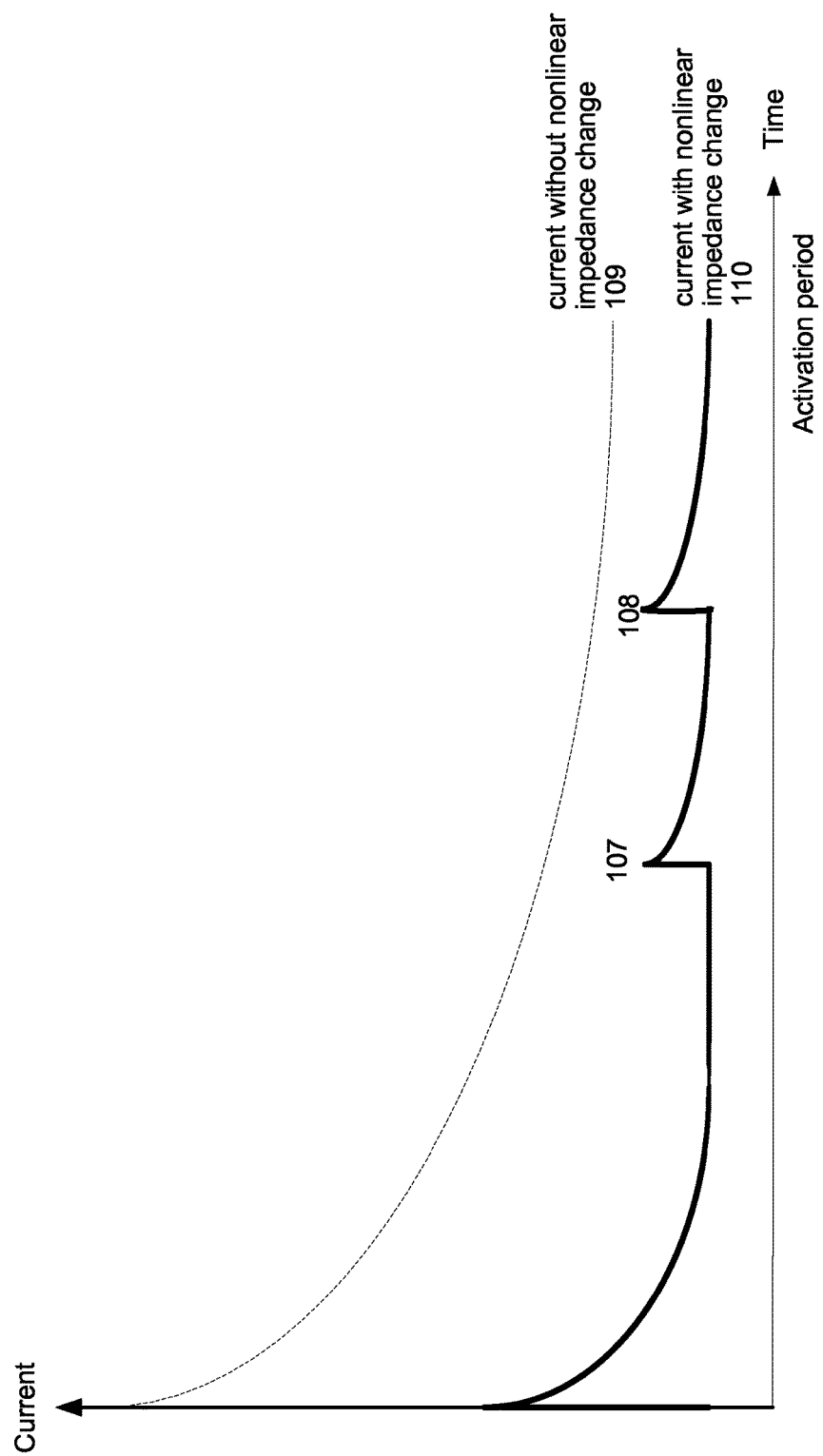
FIG. 5 illustrates a comparison between the current of a core being activated without a nonlinear change of impedance of a power delivery network and the current of the core being activated with a nonlinear change of impedance, according to some embodiments.

FIG. 5 illustrates a current curve 109 drained by a core being activated without a nonlinear change of impedance of a power delivery network is applied (e.g., similar to curve 101 in FIG. 4), and a current curve 110 drained from the core being activated when a nonlinear change of impedance of power gates is applied, according to some embodiments. As shown in FIG. 5, the nonlinear change of impedance can reduce the peak current drawn by the core being activated from a secondary power source. In some embodiments, the reduction in current draw can be more than 50% as compared to the current draw when a nonlinear change of impedance is not used. Simulation and experimental results also show that the controlled nonlinear change of impedance can prevent a drop of about 170 megahertz (MHz) in an operational frequency of an active core caused by the activation of a neighboring core.

Referring back to in FIGS. 2 and 3, the plurality of groups of power gates may be controlled by one or more control signal, and may be activated one after another or a few at a time. In some embodiments, when a group of power gates or multiple groups of power gates are activated, the combined impedance may reduce significantly, thus may cause a small spike in the current drained by the core being activated at the time a sequential group or groups of power gates is switched, such as the ones shown by spikes 107 and 108 on curve 110 of FIG. 5. In some embodiments, the sequence and the number of power gates to be activated can be precisely controlled to limit such spikes to a minimum level. Because the large number of individually controllable power gates available in the system, a desired impedance curve of the combine impedance of the power gates can be achieved by controlling the sequence and the number of power gates being activated at each time instant during the core activation period. Thus, the power consumed from a secondary power source by the core being activated during the core activation period can be precisely controlled.

Figure 6:
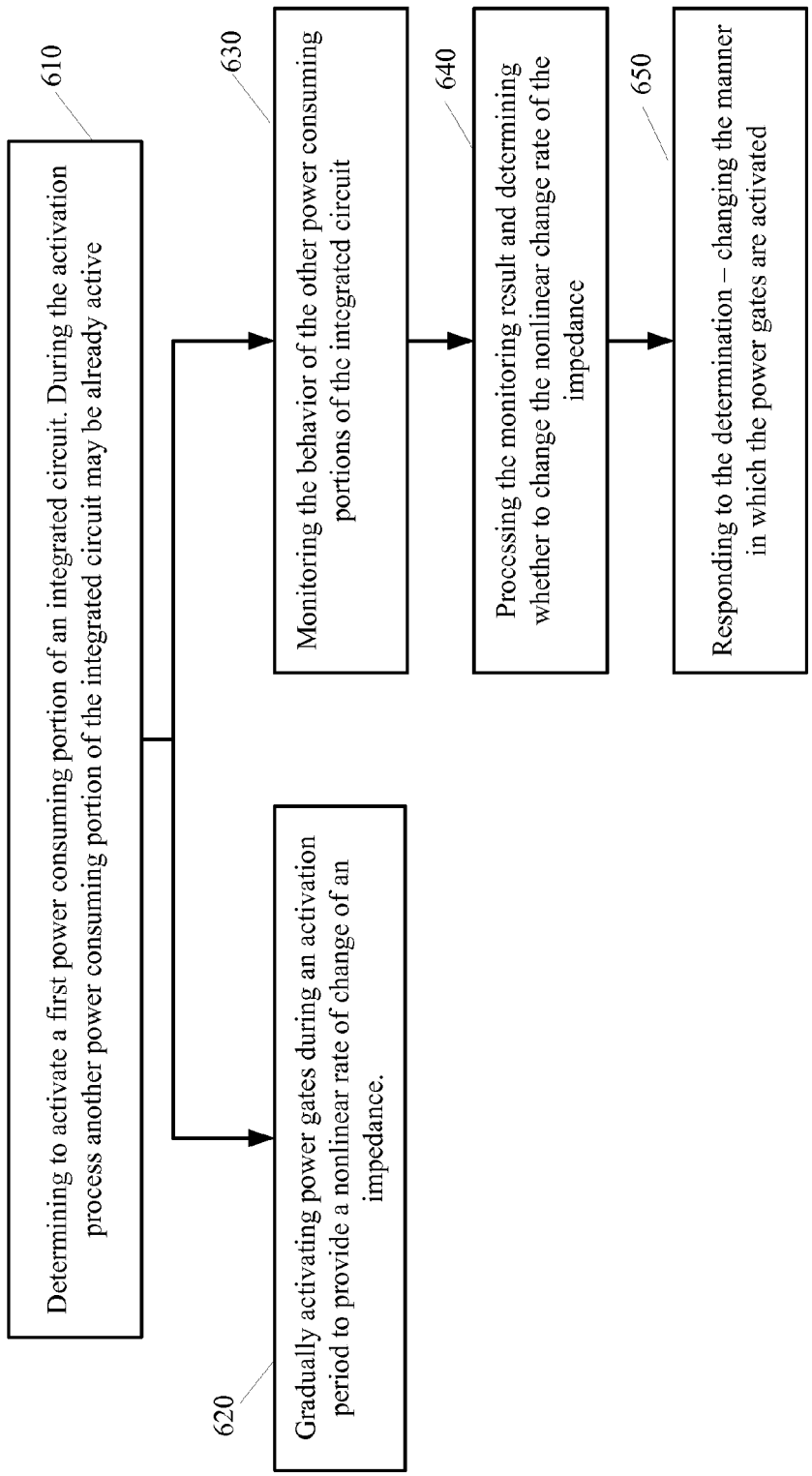
FIG. 6 illustrates a process of power management, according to some embodiments.

FIG. 6 illustrates a process 600 for controlling the activation of a core in a multi-core system according to some embodiments.

Process 600 starts at block 610 by determining to activate a first power consuming portion or a core of an integrated circuit, for example, by receiving a signal or instructions to activate a first power consuming portion of the integrated circuit. During the activation process, another power consuming portion or core of the integrated circuit may be already active.

In some embodiments, the integrated circuit can be configured to activate power gates in a manner to provide a nonlinear rate of change of impedance in response to the activation of a first power consuming portion, and block 610 may be followed by block 620. At block 620, process 600 gradually activates (e.g., via a control circuit) a plurality of power gates during a core activation period to provide a nonlinear rate of impedance change between a first set of conductors and a second set of conductors during the core activation period. The plurality of power gates are coupled between (a) the first set of conductors that are coupled to at least one power source, and (b) the second set of conductors that are coupled to the first power consuming portion of the integrated circuit. The plurality of power gates provide a controllable impedance between the first and second sets of conductors.

In some embodiments, block 620 may include at least one of the following:
  increasing (or decreasing) a number of active power gates during the core activation period in a nonlinear manner;
  varying (e.g., monotonically or non-monotonically) a number of active power gates during the core activation period in a nonlinear manner; and
  activating the power gates so that the change of the impedance follows an exponential function.

In some embodiments, block 610 may also be followed by block 630 in parallel to monitor the impact of activating the first power consuming portion such that the manner in which the power gates are activated can be modified or adjusted based on the power needs of the integrated circuit. At block 630, process 600 monitors the behavior of the other power consuming portions of the integrated circuit. This may provide a monitoring result indicative of how the activation process of the first power consuming portion affects the performance of other power consuming portions of the integrated circuit during the activation process of block 620.

Block 630 may be followed by block 640. At block 640, process 600 analyzes or processes the monitoring results, such as the results obtained during block 630, and determines whether to adjust the nonlinear change rate of the combined impedance of the plurality of power gates.

Block 640 may be followed by block 650 at which process 600 of responds to the determination by changing the manner in which the power gates are activated.

In some embodiments, process 600 may be repeated when there is a need to power up the first power consuming portion of the integrated circuit. In some embodiments, the method may, for example, activate the power gates allocated to the first power consuming portion of the integrated circuit in the same manner regardless of the status of other power consuming portions of the integrated circuit. Alternatively, the activation may be responsive to the state of other power consuming portions of the integrated circuit. Hence, in some embodiments, block 620 can be followed by block 630 such that the manner in which the power gates are activated can be adjusted between power cycles.

Figure 7:
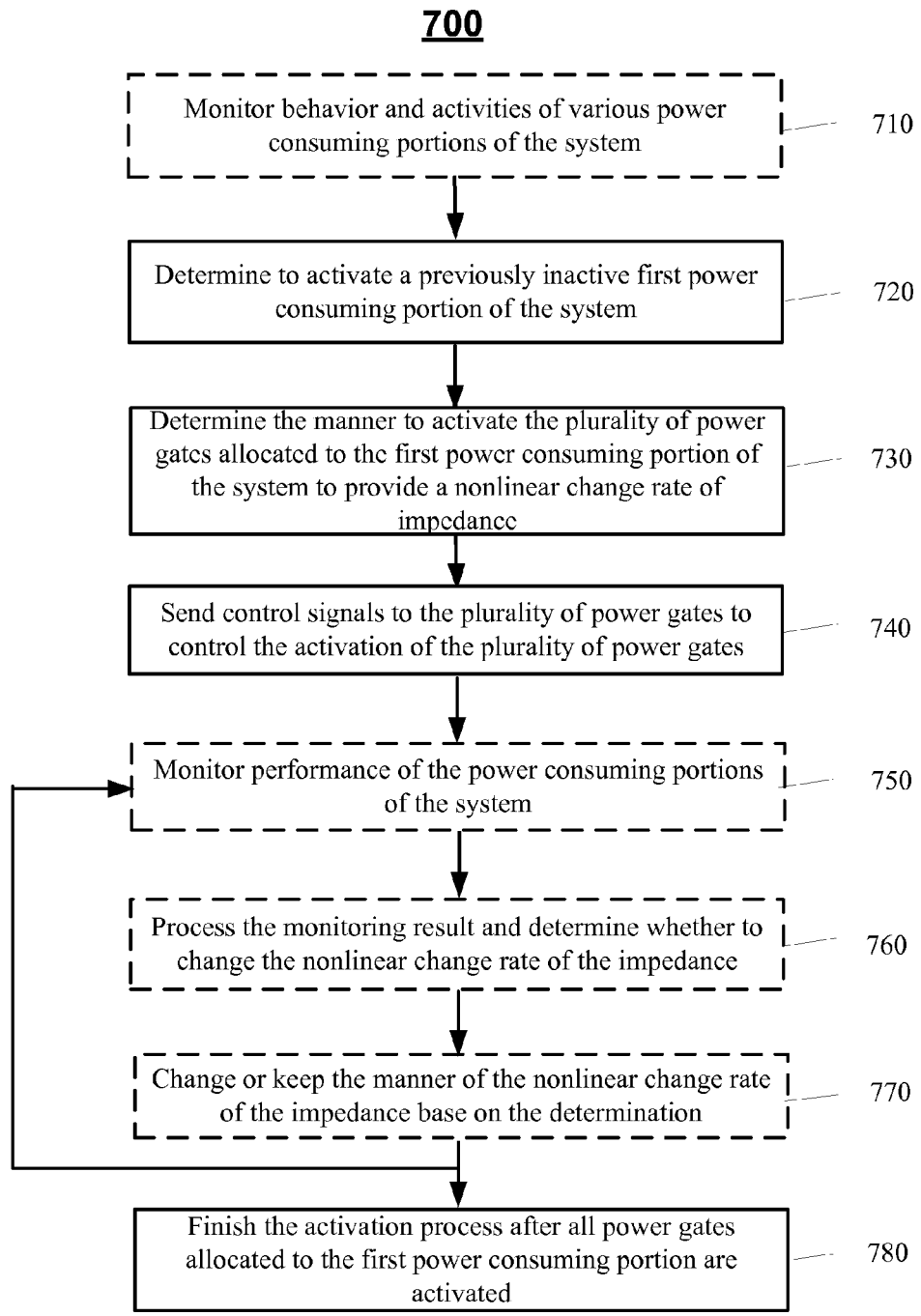
FIG. 7 illustrates a flowchart of an operation of a power management controller, according to some embodiments.

FIG. 7 illustrates a flowchart 700 of the operation of some embodiments of a controller for power management.

At block 710, a controller or another entity monitors the behavior and activities of a system during operation. In some embodiments, there may be various power consuming portions on the system that are active at a time. The controller or another entity may determine which portions of the system are active and which portions of the system are inactive. In some embodiments, the controller or another entity may constantly or periodically monitor the performance and/or power consumptions of the active power consuming portions.

At block 720, the controller determines that a first power consuming portion is to be activated based on information it received, such as the monitoring results obtained in block 710, or receiving a signal or instructions from other portions of the system, for example, a central processing unit (CPU) or other controllers to activate a first power consuming portion of an integrated circuit.

At block 730, the controller determines an appropriate impedance curve for power gates allocated to the first power consuming portion during a core activation period, based on information such as the peak dynamic current requirement of the first power consuming portion, the status of the neighboring power consuming portions, and the availability and the drive strength of nearby secondary power sources. From the desired impedance curve determined for the core activation period, the controller can determine the manner that the power gates allocated to the first power consuming portion are to be activated. This may include information about the specific power gates to be activated at various times during the core activation period.

At block 740, the controller sends control signals to the power gates allocated to the first power consuming portion to activate the power gates according to the manner determined in block 730. In this way, a combined impedance of the activated power gates could closely match the desired impedance curve. In some embodiments, one control signal may be used to control a plurality of power gates, through propagation delay or extra delay units added on the path of the control signal. In some embodiments, the control signals may be multiple synchronized signals, each controlling one or more groups of the power gates.

At block 750, the controller or another entity may monitor the performance of other active power consuming portions of the system and/or electrical parameters of the first power consuming portion. This may provide information as to how the controlled activation process of the first power consuming portion affects the performance of other power consuming portions of the system during the activation process, and whether the controlled activation process is effective. In some embodiments, the controller or another entity may also monitor the status change of the power consuming portions, such as being deactivated or activated.

At block 760, the controller may process the monitoring results obtained at block 750 and determine whether the nonlinear change rate of the combined impedance of the power gates needs to be adjusted to provide power to the first power consuming portion more efficiently while preventing intolerable performance drop of other active power consuming portions of the system.

At block 770, the controller either adjusts or keeps the previously determined manner of the nonlinear change rate of the combined impedance of the power gates, depending on the decision made at block 760. In some embodiments, blocks 750 to 770 are optional. In some embodiments, blocks 750 to 770 may be performed iteratively during a core activation period.

At block 780, after all power gates allocated to the first power consuming portion are activated, the controlled activation process finishes, and a main power source provides a majority of the current consumed by the first power consuming portion.

The above disclosure describes the activation process of a previously inactive power consuming portion of a system. In some embodiments, because a desired impedance curve may be achieved by controlling the plurality of power gates, the turning off of a previously active power consuming portion can be controlled in a desired manner as well according to methods similar to those described above. As such, activation of a power consuming portion of a system or a power gate may refer to switching on or switching off the power consuming portion or the power gates, using either negative logic or positive logic.

The drawings and the description above describe non-limiting embodiments of systems and methods. The specification and drawings are, accordingly, to be regarded in an illustrative rather than a restrictive sense. It will, however, be evident that various modifications and changes may be made thereunto without departing from the broader spirit and scope of the disclosure as set forth in the claims.

While the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure.

The connections as discussed herein may be any type of connection suitable to transfer signals from or to respective nodes, units or devices, for example via intermediate devices. Accordingly, unless implied or stated otherwise, the connections may, for example, be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

As used herein, activation of a power consuming portion of a system or a power gate may refer to switching on or switching off the power consuming portion or the power gate, using either negative logic or positive logic.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieving the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in some embodiments, the illustrated examples may be implemented as circuitry located on a single integrated circuit or within a same device. Alternatively, in some embodiments, the examples may be implemented as any number of separate integrated circuits or separate devices interconnected with each other in a suitable manner.

Also for example, the examples, or portions thereof, may be implemented as soft or code representations of physical circuitry, or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

Some embodiments may include a variety of storage media and computer readable media for storing data and instructions for performing the disclosed methods. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. While certain embodiments of the present disclosure have been illustrated and described herein, variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
a plurality of processing cores;
a primary power grid coupled to at least one power source for distributing power to the plurality of processing cores;
a plurality of secondary power grids, wherein each secondary power grid is coupled to a respective one of the processing cores;
a plurality of sets of power gates, wherein each set of power gates is configured to provide one or more power paths between the primary power grid and a respective one of the secondary power grids to provide power to a corresponding processing core; and
a control circuit that, in response to one of the processing cores being turned on or off, switches the set of power gates allocated to that processing core in a sequence that provides a nonlinear rate of impedance change between the primary power grid and the secondary power grid corresponding to that processing core, wherein the nonlinear rate of impedance change is based on a monitoring result, the monitoring result being based on monitoring an electrical parameter of at least one of the processing cores of the integrated circuit during a previous core activation period.

2. The integrated circuit device of claim 1, wherein each set of power gates comprises a plurality of power gate groups of different impedances.

3. The integrated circuit device of claim 1, wherein the nonlinear rate of impedance change follows an exponential function.

4. The integrated circuit device of claim 1, wherein the plurality of sets of power gates includes more than a hundred power gates, more than a thousand power gates, or more than ten thousand power gates.

5. An integrated circuit comprising:
a first set of conductors coupled to at least one power source;
a second set of conductors coupled to a first power consuming portion of an integrated circuit;
multiple power gates coupled between the first and second sets of conductors; and
a control circuit configured to activate the multiple power gates during an activation period to provide a nonlinear rate of change of an impedance between the first and the second sets of conductors during the activation period, wherein the nonlinear rate of change is based on a monitoring result, the monitoring result being based on monitoring an electrical parameter of at least one of the first power consuming portion or a second power consuming portion of the integrated circuit during a previous core activation period.

6. The integrated circuit according to claim 5, wherein the control circuit is configured to increase a number of active power gates during the activation period in a nonlinear manner.

7. The integrated circuit according to claim 5, wherein the control circuit is configured to vary a number of active power gates during the activation period in a nonlinear manner.

8. The integrated circuit according to claim 5, wherein change of the impedance follows an exponential function.

9. The integrated circuit according to claim 5, wherein the at least one power source comprises a main power source, a first secondary power source, and a second secondary power source; wherein the second secondary power source is configured to provide power to a second power consuming portion of the integrated circuit.

10. The integrated circuit according to claim 9, wherein the nonlinear rate of change of the impedance reduces a current being drawn by the first power consuming portion from the second secondary power source during the activation period.

11. The integrated circuit according to claim 5, wherein the multiple power gates are arranged in groups of power gates that are independently controlled from each other.

12. The integrated circuit according to claim 5, wherein the multiple power gates are arranged in groups of power gates that form a daisy chain.

13. A method for managing power in an integrated circuit, the method comprising:
receiving, by a control circuit, a signal to activate a first power consuming portion of the integrated circuit, the integrated circuit comprising a first set of conductors coupled to at least one power source, the integrated circuit further comprising a second set of conductors coupled to the first power consuming portion, multiple power gates being coupled between the first and second sets of conductors; and
activating, by the control circuit, the multiple power gates during a core activation period to provide a nonlinear rate of change of an impedance between the first and second sets of conductors during the core activation period, wherein the nonlinear rate of change is based on a monitoring result, the monitoring result being based on monitoring an electrical parameter of at least one of the first power consuming portion or a second power consuming portion of the integrated circuit during a previous core activation period.

14. The method according to claim 13, wherein activating the multiple power gates during the core activation period comprises increasing a number of active power gates during the core activation period in a nonlinear manner.

15. The method according to claim 13, wherein activating the multiple power gates during the core activation period comprises varying a number of active power gates during the core activation period in a nonlinear manner.

16. The method according to claim 13, wherein the change of the impedance follows an exponential function.

17. The method according to claim 13, wherein the at least one power source comprises a main power source, a first secondary power source, and a second secondary power source; wherein the method further comprises providing by the second secondary power source power to a second power consuming portion of the integrated circuit.

18. The method according to claim 13, wherein the multiple power gates are configured in groups of power gates that are independently controlled from each other.

19. The method according to claim 13, wherein the multiple power gates are configured in groups of power gates that form a daisy chain.

* * * * *